US009426606B2

(12) United States Patent
Lee et al.

(10) Patent No.: US 9,426,606 B2
(45) Date of Patent: Aug. 23, 2016

(54) ELECTRONIC APPARATUS AND METHOD OF PAIRING IN ELECTRONIC APPARATUS

(71) Applicant: Samsung Electronics Co., Ltd., Suwon-si, Gyeonggi-do (KR)

(72) Inventors: Ki-Wan Lee, Seongnam-si (KR); Jong-Hyun Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/633,894

(22) Filed: Feb. 27, 2015

(65) Prior Publication Data

US 2015/0373484 A1    Dec. 24, 2015

(30) Foreign Application Priority Data

Jun. 19, 2014    (KR) .................. 10-2014-0075103

(51) Int. Cl.
*H04W 4/00*    (2009.01)
*H04W 76/02*    (2009.01)
*H04W 8/08*    (2009.01)
*H04W 84/12*    (2009.01)

(52) U.S. Cl.
CPC .............. *H04W 4/008* (2013.01); *H04W 8/08* (2013.01); *H04W 76/023* (2013.01); *H04W 84/12* (2013.01)

(58) Field of Classification Search
CPC ..... H04W 4/008; H04W 8/08; H04W 84/18; H04W 88/06
USPC ................................ 455/41.2, 41.3
See application file for complete search history.

(56) References Cited

U.S. PATENT DOCUMENTS

| 5,856,830 A * | 1/1999 | Yamamoto | G09G 5/14 345/474 |
| 7,339,484 B2 * | 3/2008 | Pradhan | H04W 48/08 340/538.15 |
| 7,813,715 B2 * | 10/2010 | McKillop | G06F 21/445 455/410 |
| 7,881,295 B2 * | 2/2011 | Fry | H04L 29/12254 370/392 |
| 8,131,214 B2 * | 3/2012 | Braun | H04M 1/7253 455/41.1 |
| 8,141,775 B1 * | 3/2012 | Aidasani | G06Q 20/3223 235/379 |
| 8,164,567 B1 * | 4/2012 | Barney | A63F 13/235 345/158 |
| 8,172,135 B1 * | 5/2012 | Aidasani | G06Q 20/3223 235/379 |

(Continued)

FOREIGN PATENT DOCUMENTS

KR    10-0642683 B1    10/2006
KR    10-0863420 B1    10/2008

(Continued)

*Primary Examiner* — Hai V Nguyen
(74) *Attorney, Agent, or Firm* — Jefferson IP Law, LLP

(57) ABSTRACT

An electronic apparatus is provided. The electronic apparatus includes a communication unit configured to transmit an altered apparatus Identification (ID) and a controller configured to detect a user's action in a pairing mode of the electronic apparatus, to determine additional information according to the user's action, and to transmit the altered apparatus ID including an apparatus ID of the electronic apparatus and the additional information to another electronic apparatus that can be paired with the electronic apparatus.

20 Claims, 9 Drawing Sheets

(56) References Cited

U.S. PATENT DOCUMENTS

| | | | | |
|---|---|---|---|---|
| 8,175,617 | B2* | 5/2012 | Rodriguez | G01C 21/3629 455/456.1 |
| 8,181,233 | B2* | 5/2012 | Wyld | H04L 63/08 726/5 |
| 8,219,028 | B1* | 7/2012 | Flamholz | G06F 1/1694 455/41.2 |
| 8,421,748 | B2* | 4/2013 | Tanaka | H04B 13/005 345/156 |
| 8,437,353 | B2* | 5/2013 | Fry | H04L 29/12254 370/392 |
| 8,467,770 | B1* | 6/2013 | Ben Ayed | H04L 63/107 455/41.1 |
| 8,489,115 | B2* | 7/2013 | Rodriguez | G01C 21/3629 455/456.1 |
| 8,516,533 | B2* | 8/2013 | Davis | H04N 21/482 725/115 |
| 8,544,729 | B2* | 10/2013 | Aidasani | G06Q 20/3223 235/379 |
| 8,572,375 | B2* | 10/2013 | Bishop | G06F 21/36 713/168 |
| 8,594,003 | B2* | 11/2013 | Han | G01S 5/0252 370/310 |
| 8,594,565 | B2* | 11/2013 | Satoh | G08C 17/00 345/173 |
| 8,634,777 | B2* | 1/2014 | Ekbatani | H04W 8/005 340/539.1 |
| 8,660,605 | B2* | 2/2014 | Fleming | H04M 1/04 455/404.1 |
| 8,665,877 | B2* | 3/2014 | Fry | H04L 29/12254 370/392 |
| 8,699,944 | B2* | 4/2014 | Malamud | H04L 63/0861 455/39 |
| 8,711,034 | B2* | 4/2014 | Piersol | G01C 21/206 342/357.2 |
| 8,737,986 | B2* | 5/2014 | Rhoads | G01C 21/3629 455/426.1 |
| 8,768,286 | B2* | 7/2014 | Naboulsi | A61B 5/18 340/575 |
| 8,831,639 | B2* | 9/2014 | Park | G06Q 10/10 455/456.3 |
| 8,836,718 | B2* | 9/2014 | Choi | G06F 1/1694 345/173 |
| 8,839,389 | B2* | 9/2014 | Cohen | H04L 63/061 455/41.1 |
| 8,866,734 | B2* | 10/2014 | Lee | G06F 1/1626 345/156 |
| 8,879,430 | B2* | 11/2014 | Goodman | H04L 12/66 370/259 |
| 8,885,878 | B2* | 11/2014 | Pettit | G06F 3/017 345/156 |
| 8,892,752 | B2* | 11/2014 | Singh | G06F 17/3089 709/228 |
| 8,913,957 | B2* | 12/2014 | Eun | H04M 1/7253 370/328 |
| 8,983,490 | B2* | 3/2015 | Un | H04W 64/00 455/456.1 |
| 9,002,536 | B2* | 4/2015 | Hatton | B60R 25/24 340/426.13 |
| 9,082,413 | B2* | 7/2015 | Herring | G10L 25/51 |
| 9,083,810 | B2* | 7/2015 | Jung | H04M 1/72522 |
| 9,086,839 | B2* | 7/2015 | Griffin | G06F 3/1446 |
| 9,094,405 | B2* | 7/2015 | Buck | H04L 9/0872 |
| 9,106,275 | B2* | 8/2015 | Griffin | H04B 5/02 |
| 9,111,076 | B2* | 8/2015 | Park | G06F 3/0412 |
| 9,113,190 | B2* | 8/2015 | Clavin | G06F 1/3231 |
| 9,143,917 | B2* | 9/2015 | Kim | H04W 8/005 |
| 9,154,837 | B2* | 10/2015 | Krum | G06Q 30/02 |
| 9,160,835 | B1* | 10/2015 | Beckman | H04M 1/7253 |
| 9,167,064 | B2* | 10/2015 | Elter | H04M 1/04 |
| 9,167,071 | B2* | 10/2015 | Mallinson | A63F 13/12 |
| 9,168,895 | B2* | 10/2015 | Hatton | B60R 25/24 |
| 9,191,394 | B2* | 11/2015 | Novak | H04L 63/102 |
| 9,191,773 | B2* | 11/2015 | Fry | H04L 29/12254 |
| 9,209,867 | B2* | 12/2015 | Royston | H04B 5/0043 |
| 9,210,727 | B2* | 12/2015 | Widner | H04W 76/021 |
| 9,226,330 | B2* | 12/2015 | Abdurrahman | H04W 76/023 |
| 9,244,149 | B2* | 1/2016 | Piersol | G01S 5/0236 |
| 9,247,212 | B2* | 1/2016 | Bose | H04N 7/18 |
| 9,294,428 | B2* | 3/2016 | Nordstrom | H04L 51/32 |
| 9,319,419 | B2* | 4/2016 | Sprague | H04L 63/126 |
| 2004/0003133 | A1* | 1/2004 | Pradhan | H04W 48/08 719/318 |
| 2005/0088275 | A1* | 4/2005 | Valoteau | G08C 19/28 340/3.1 |
| 2005/0093868 | A1* | 5/2005 | Hinckley | G06F 3/011 345/502 |
| 2006/0206833 | A1* | 9/2006 | Capper | H04M 1/7253 715/773 |
| 2007/0033154 | A1* | 2/2007 | Trainum | G06F 21/10 |
| 2008/0016537 | A1* | 1/2008 | Little | H04L 63/0853 725/81 |
| 2008/0057868 | A1* | 3/2008 | Chang | H04M 1/6058 455/41.2 |
| 2008/0091931 | A1* | 4/2008 | McNutt | G05B 19/054 713/1 |
| 2008/0265143 | A1* | 10/2008 | Peters | G06F 3/0304 250/221 |
| 2009/0081183 | A1* | 3/2009 | Margolis | A61K 38/1709 424/94.6 |
| 2009/0183199 | A1* | 7/2009 | Stafford | H04H 60/375 725/34 |
| 2009/0239505 | A1* | 9/2009 | Ramakrishnan | H04L 12/587 455/413 |
| 2010/0318942 | A1* | 12/2010 | Banyasad | G06T 11/206 715/854 |
| 2011/0055380 | A1* | 3/2011 | Yockey | H04L 41/0896 709/224 |
| 2011/0106954 | A1* | 5/2011 | Chatterjee | G06F 1/1632 709/227 |
| 2011/0110371 | A1* | 5/2011 | Fry | H04L 29/12254 370/392 |
| 2011/0169654 | A1* | 7/2011 | Ketari | G08B 13/1427 340/687 |
| 2011/0175879 | A1* | 7/2011 | Tanaka | H04B 13/005 345/211 |
| 2011/0191237 | A1* | 8/2011 | Faith | G06F 1/1694 705/39 |
| 2012/0156997 | A1* | 6/2012 | Kim | H04W 8/005 455/41.2 |
| 2012/0170560 | A1* | 7/2012 | Han | G01S 5/0252 370/338 |
| 2012/0198098 | A1* | 8/2012 | Kim | H04L 67/16 710/8 |
| 2012/0218436 | A1* | 8/2012 | Rhoads | G01C 21/3629 348/222.1 |
| 2012/0220311 | A1* | 8/2012 | Rodriguez | G01C 21/3629 455/456.1 |
| 2012/0244803 | A1* | 9/2012 | Sudou | H04M 1/7253 455/41.1 |
| 2012/0283894 | A1* | 11/2012 | Naboulsi | A61B 5/18 701/1 |
| 2012/0288103 | A1* | 11/2012 | van Staalduinen | G06F 1/1626 381/56 |
| 2012/0322379 | A1* | 12/2012 | Eun | H04M 1/7253 455/41.2 |
| 2012/0330835 | A1* | 12/2012 | Aidasani | G06Q 20/4012 705/44 |
| 2013/0006847 | A1* | 1/2013 | Hammad | G06Q 20/20 705/39 |
| 2013/0095757 | A1* | 4/2013 | Abdelsamie | H04W 4/001 455/41.1 |
| 2013/0097080 | A1* | 4/2013 | Smets | G06T 1/20 705/44 |
| 2013/0128022 | A1* | 5/2013 | Bose | H04N 7/18 348/77 |
| 2013/0152139 | A1* | 6/2013 | Davis | H04N 21/482 725/61 |
| 2013/0185368 | A1* | 7/2013 | Nordstrom | H04L 51/32 709/206 |
| 2013/0190907 | A1* | 7/2013 | Ellis | A61B 5/1038 700/91 |
| 2013/0201097 | A1* | 8/2013 | Pasquero | G06F 3/0488 345/156 |

(56) References Cited

U.S. PATENT DOCUMENTS

| | | | |
|---|---|---|---|
| 2013/0231054 A1* | 9/2013 | Fry | H04L 29/12254 455/41.2 |
| 2013/0237193 A1* | 9/2013 | Dumas | G07C 9/00571 455/414.1 |
| 2013/0260781 A1* | 10/2013 | Un | H04W 64/00 455/456.1 |
| 2013/0283193 A1* | 10/2013 | Griffin | G06F 3/1446 715/761 |
| 2013/0320080 A1* | 12/2013 | Olson | G06K 19/06206 235/380 |
| 2013/0320081 A1* | 12/2013 | Olson | G06K 19/06206 235/380 |
| 2013/0332848 A1* | 12/2013 | Lam | G06F 3/017 715/751 |
| 2013/0340003 A1* | 12/2013 | Davis | H04N 21/482 725/38 |
| 2014/0045480 A1* | 2/2014 | Hsieh | G06F 1/1643 455/418 |
| 2014/0071272 A1* | 3/2014 | Rodriguez | G01C 21/3629 348/143 |
| 2014/0073252 A1* | 3/2014 | Lee | H04W 4/008 455/41.2 |
| 2014/0075004 A1* | 3/2014 | Van Dusen | H04L 41/04 709/223 |
| 2014/0155031 A1* | 6/2014 | Lee | G06F 21/35 455/411 |
| 2014/0179234 A1* | 6/2014 | Lee | H04W 76/023 455/41.2 |
| 2014/0214630 A1* | 7/2014 | N | G06Q 30/06 705/27.2 |
| 2014/0220896 A1* | 8/2014 | Fry | H04L 29/12254 455/41.2 |
| 2014/0235166 A1* | 8/2014 | Molettiere | H04B 7/26 455/41.2 |
| 2014/0273845 A1* | 9/2014 | Russell | H04W 76/023 455/41.2 |
| 2014/0279145 A1* | 9/2014 | Hyde | G06Q 30/08 705/26.3 |
| 2014/0282735 A1* | 9/2014 | Davis | H04N 21/482 725/48 |
| 2014/0323049 A1* | 10/2014 | Park | H04W 76/02 455/41.2 |
| 2014/0323142 A1* | 10/2014 | Rodriguez | G06F 3/04842 455/452.1 |
| 2014/0335789 A1* | 11/2014 | Cohen | H04W 8/005 455/41.2 |
| 2014/0347223 A1* | 11/2014 | Hyde | H01Q 3/00 342/385 |
| 2014/0372920 A1* | 12/2014 | Choi | G06F 1/1694 715/765 |
| 2014/0375428 A1* | 12/2014 | Park | G06K 7/10237 340/10.1 |
| 2015/0009043 A1* | 1/2015 | Quinlan | H04L 67/12 340/870.3 |
| 2015/0015504 A1* | 1/2015 | Lee | G06F 3/04845 345/173 |
| 2015/0040211 A1* | 2/2015 | Lee | G06F 1/1626 726/16 |
| 2015/0072619 A1* | 3/2015 | Abdurrahman | H04W 76/023 455/41.2 |
| 2015/0073983 A1* | 3/2015 | Bartenstein | G06Q 20/3415 705/41 |
| 2015/0087236 A1* | 3/2015 | Eun | H04M 1/7253 455/41.2 |
| 2015/0089568 A1* | 3/2015 | Sprague | H04L 63/0876 726/1 |
| 2015/0100463 A1* | 4/2015 | Drazin | G06Q 10/101 705/27.1 |
| 2015/0134513 A1* | 5/2015 | Olson | G06K 19/06206 705/39 |
| 2015/0138101 A1* | 5/2015 | Park | G06F 3/0412 345/173 |
| 2015/0140934 A1* | 5/2015 | Abdurrahman | H04W 76/023 455/41.2 |
| 2015/0161836 A1* | 6/2015 | Park | G07C 9/00134 340/5.51 |
| 2015/0175127 A1* | 6/2015 | Hatton | B60R 25/24 455/420 |
| 2015/0215770 A1* | 7/2015 | Chan | H04W 12/04 455/456.1 |
| 2015/0289298 A1* | 10/2015 | Widner | H04W 76/021 455/41.2 |
| 2015/0309657 A1* | 10/2015 | Park | G06F 3/0412 345/173 |
| 2015/0319290 A1* | 11/2015 | Jung | H04M 1/72522 455/418 |
| 2015/0358696 A1* | 12/2015 | Yeo | G08B 25/10 340/870.07 |

FOREIGN PATENT DOCUMENTS

| | | |
|---|---|---|
| KR | 10-2010-0057721 A | 6/2010 |
| KR | 10-2012-0088962 A | 8/2012 |

\* cited by examiner

ELECTRONIC APPARATUS AND METHOD OF PAIRING IN ELECTRONIC APPARATUS

CROSS-REFERENCE TO RELATED APPLICATION(S)

This application claims the benefit under 35 U.S.C. §119 (a) of a Korean patent application filed on Jun. 19, 2014 in the Korean Intellectual Property Office and assigned Serial number 10-2014-0075103, the entire disclosure of which is hereby incorporated by reference.

TECHNICAL FIELD

The present disclosure relates to an electronic apparatus and a method of pairing by the electronic apparatus. More particularly, the present disclosure relates to pairing another electronic apparatus to the electronic apparatus based on an apparatus identification (ID) and additional information.

BACKGROUND

With the development of mobile communication, users are able to use portable electronic apparatuses, such as portable terminals, smart phones, and wearable devices, which can be easily carried by the user and have at least one of a function of communication for transmitting and receiving voice and video data, a function of inputting and outputting information, a function of storing data, and the like.

These electronic apparatuses have adopted various additional functions, such as, for example, a function of pairing with another electronic apparatus by using a wireless communication technology.

For example, there are various types of pairing, such as Wireless Fidelity (Wi-Fi) pairing, by which the electronic apparatuses may communicate with each other by using Wi-Fi modules, Bluetooth pairing, by which the electronic apparatuses may communicate with each other by using Bluetooth modules, hot-spot pairing and pairing by tethering.

In general, in pairing, each electronic apparatus may search for and display information regarding other electronic apparatuses that can be paired (connected) therewith.

However, since these electronic apparatuses may search for a multitude of electronic apparatuses while pairing, the user may have a hard time recognizing the desired electronic apparatus that he or she wishes to pair with.

Further, a user typically has several different electronic apparatuses, such as portable terminals, smart phones and wearable devices, such that many different services are provided based on pairing between the electronic apparatuses. Accordingly, there is an increase in the number of electronic apparatuses that the user may be searching for when pairing. As such, it may be difficult for the user to recognize the correct electronic apparatus that he or she wishes to pair with among the multitude of electronic apparatuses The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a method of pairing by the electronic apparatus, by which an electronic apparatus to be paired with may be correctly and quickly recognized in the pairing between the electronic apparatuses.

Another aspect of the present disclosure is to provide an electronic apparatus and a method of pairing by the electronic apparatus, by which an electronic apparatus to be searched for may surely inform the searching electronic apparatus that the searched-for electronic apparatus is to be paired, and the searching electronic apparatus may surely display which electronic apparatus is to be paired.

In accordance with an aspect of the present disclosure, an electronic apparatus is provided. The electronic apparatus includes a communication unit configured to transmit an altered apparatus Identification (ID) and a controller configured to detect a user's action in a pairing mode of the electronic apparatus, to determine additional information according to the user's action, and to transmit the altered apparatus ID including an apparatus ID of the electronic apparatus and the additional information to another electronic apparatus that can be paired with the electronic apparatus.

In accordance with another aspect of the present disclosure, an electronic apparatus is provided. The electronic apparatus includes a communication unit configured to receive an altered apparatus ID including an apparatus ID and additional information from another electronic apparatus that can be paired with the electronic apparatus, a controller configured to determine a display method corresponding to the additional information included in the received altered apparatus ID in a pairing mode, to make the additional information included in the altered apparatus ID hidden and to display the apparatus ID according to the determined display method, and a display unit configured to display the apparatus ID according to the determined display method.

In accordance with another aspect of the present disclosure, a method of pairing an electronic apparatus and another electronic apparatus is provided. The method includes detecting, by the electronic apparatus, a user's action in a pairing mode of the electronic apparatus, determining additional information according to the user's action, creating an altered apparatus ID that includes the additional information and an apparatus ID of the electronic apparatus, and transmitting the altered apparatus ID to the other electronic apparatus.

In accordance with another aspect of the present disclosure, a method of pairing an electronic apparatus and another electronic apparatus is provided. The method includes receiving an altered apparatus ID that includes an apparatus ID and additional information from the other electronic apparatus, determining a display method corresponding to the additional information included in the altered apparatus ID, making the additional information included in the altered apparatus ID hidden, and displaying the apparatus ID according to the determined display method.

According to various embodiments of the present disclosure, the electronic apparatus that is to be paired may be displayed by a more effective user interface in the pairing between the electronic apparatuses, so the user can surely and quickly recognize the electronic apparatus that he or she wishes to pair with.

Further, according to various embodiments of the present disclosure, the electronic apparatus to be searched for may transmit additional information to the searching electronic apparatus, so the searched-for electronic apparatus may surely inform the searching electronic apparatus that the searched-for electronic apparatus is the target to be paired, and the searching electronic apparatus may surely display which electronic apparatus is to be paired.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
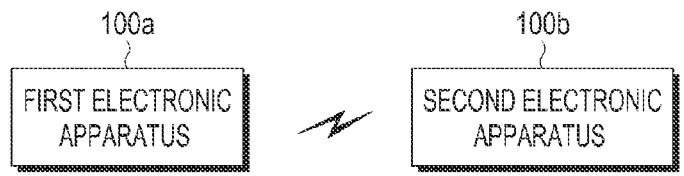
FIG. 1 is a view illustrating electronic apparatuses according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "include" and "may include" may refer to an existence of a corresponding function, operation, and/or element, and do not limit one or more additional functions, operations, and/or elements. In the present disclosure, the terms such as "include" and "have" may be construed to denote a certain characteristic, number, step, operation, constituent element, component and/or a combination thereof, but may not be construed to exclude the existence of or a possibility of an addition of one or more other characteristics, numbers, steps, operations, constituent elements, components and/or combinations thereof.

The term "or" used in various embodiments of the present disclosure includes any or all of combinations of listed words. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions may be used merely for the purpose of distinguishing one element from the other elements. For example, a first user device and a second user device indicate different user devices although both of them are user devices. For example, without departing from the scope of the present disclosure, a first component element may be named a second component element. Similarly, the second component element also may be named the first component element.

In a case where a component is referred to as being "connected" or "accessed" to another component, it should be understood that not only the component is directly connected or accessed to the other component, but also, there may exist another component between them. Meanwhile, in a case where a component is referred to as being "directly connected" or "directly accessed" to other component, it should be understood that there is no component therebetween.

The terms used in various embodiments of the present disclosure are merely used to exemplify a certain embodiment and should not limit various embodiments of the present disclosure.

Unless defined otherwise, all terms used herein, including technical and scientific terms, have the same meanings as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to various embodiments, the electronic device may be a smart home appliance. The smart home appliances may include at least one of, for example, a Televisions (TV), a digital video disk (DVD) player, an audio player, a refrigerator, an air conditioner, a cleaner, an oven, a microwave, a washing machine, an air purifier, a set-top box, a TV box (e.g., HomeSync™ of Samsung, Apple TV™, or Google TV™), a game console, an electronic dictionary, an electronic key, a camcorder, an electronic frame, and the like.

According to various embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, electronic nautical equipment (for example, navigation equipment for a ship, a gyro compass and the like), avionics, a security device, and an industrial or home robot.

In accordance with various embodiments, the electronic device may include at least one piece of furniture or a part of a building/structure, an electronic board, an electronic signature receiving device, a projector, and/or various types of measuring equipment (e.g., equipment for water supply measurement, electricity measurement, gas measurement and/or radio measurement). An electronic device according to various embodiments of the present disclosure may be a combination of one or more of above described various devices. Further, it is apparent to those skilled in the art that the electronic device according to the various embodiments of the present disclosure is not limited to the aforementioned devices.

FIGS. 1 through 10, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a view illustrating electronic apparatuses according to an embodiment of the present disclosure.

Referring to FIG. 1, a first electronic apparatus 100a and a second electronic apparatus 100b are illustrated, where the first and second electronic apparatuses 100a and 100b may perform a pairing operation by using a wireless communication method. According to various embodiments of the present disclosure, the wireless communication method may include a Bluetooth communication method, a Wireless Fidelity (Wi-Fi) direct communication method, a hot-spot communication method, a tethering communication method, and the like. Furthermore, any communication method that allows the electronic apparatuses 100a and 100b to pair with each other may be used. According to an embodiment of the present disclosure, the pairing between the first electronic apparatus 100a and the second electronic apparatus 100b may include pairing between smart phones, pairing between a wearable device and a smart phone and pairing between wearable devices, and may include pairing in various forms by which the electronic apparatuses 100a and 100b may be paired with each other.

Figure 2:
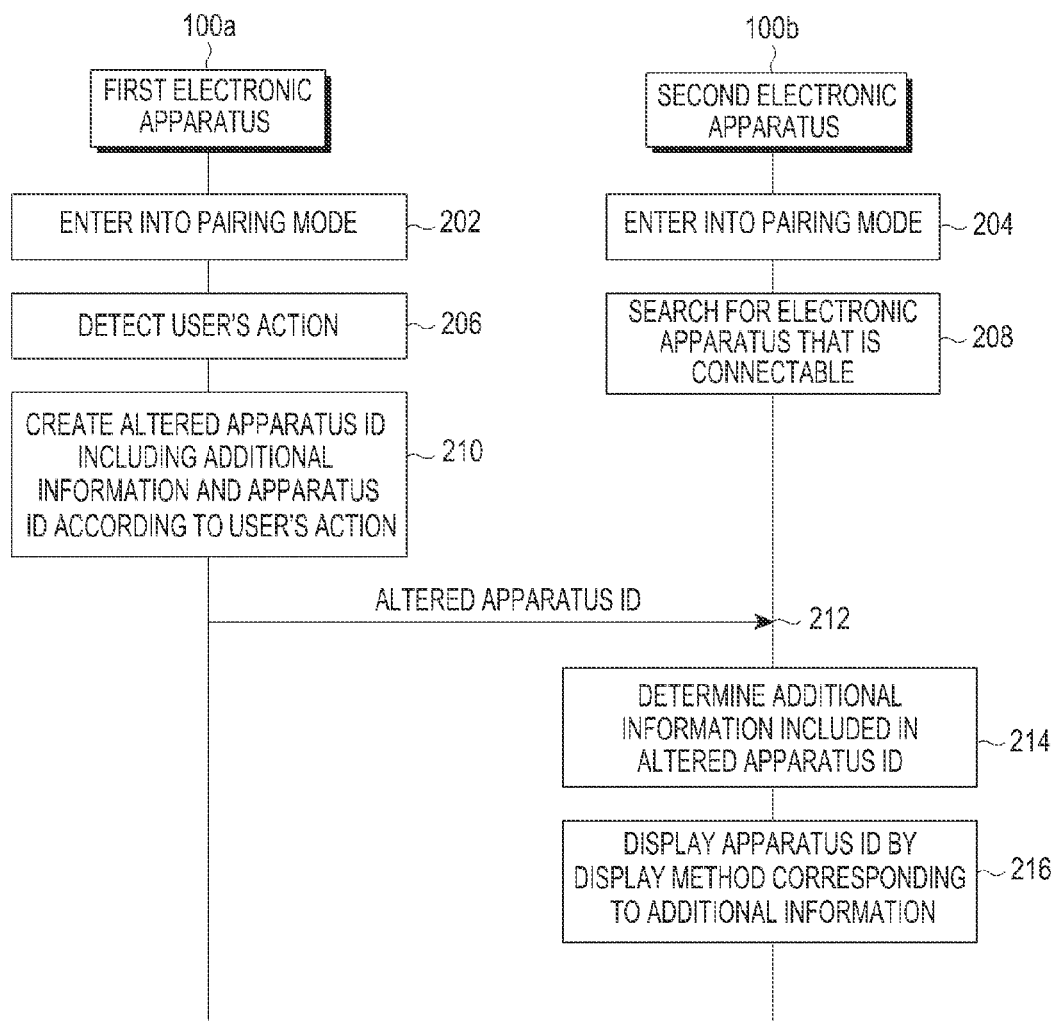
FIG. 2 is a view illustrating a pairing operation between electronic apparatuses according to an embodiment of the present disclosure.

FIG. 2 is a view illustrating a pairing operation between electronic apparatuses according to an embodiment of the present disclosure.

Referring to FIG. 2, a first electronic apparatus 100a and a second electronic apparatus 100b are illustrated, where the first and second electronic apparatuses 100a and 100b may enter into a pairing mode in operation 202 and operation 204, respectively. According to an embodiment of the present disclosure, the first electronic apparatus 100a and the second electronic apparatus 100b may be paired with each other by using a wireless communication method according to a user's request for pairing. According to various embodiments of the present disclosure, the wireless communication method may include a Bluetooth communication method, a Wi-Fi-direct communication method, a hot-spot communication method, a tethering communication method, and the like.

The first electronic apparatus 100a may detect a user's action that requests the pairing in operation 206 after entry into a pairing mode. According to an embodiment of the present disclosure, the user's action may include an action by which the user shakes the first electronic apparatus 100a, an action by which the user taps a microphone of the first electronic apparatus 100a, and/or an action by which the user presses one of a button and a key of the first electronic apparatus 100a. When the user's action is detected, the first electronic apparatus 100a may create an altered apparatus Identification (ID) that includes additional information (referred to as a "hidden ID") according to the user's action and the apparatus ID in operation 210.

According to an embodiment of the present disclosure, the apparatus ID may be information for identifying the first electronic apparatus 100a. According to an embodiment of the present disclosure, the apparatus ID may be an apparatus name, an apparatus type, and/or an apparatus model name corresponding to the first electronic apparatus 100a. According to an embodiment of the present disclosure, the apparatus ID may be predefined by the user.

According to an embodiment of the present disclosure, in a case of the user's action by which the user shakes the first electronic apparatus 100a, the additional information according to the user's action may be determined by how long the first electronic apparatus 100a is shaken, by how strong the first electronic apparatus 100a is shaken, and/or by how many times the first electronic apparatus 100a is shaken.

According to an embodiment of the present disclosure, in a case of the user's action by which the user taps the microphone of the first electronic apparatus 100a, the additional information according to the user's action may be determined by how strong the user taps the microphone, and/or by how many times the user taps the microphone.

According to an embodiment of the present disclosure, in a case of the user's action by which the user presses one of a button and a key of the first electronic apparatus 100a, the additional information according to the user's action may be determined by how long the user presses the one of the button and the key, and/or by how many times the user presses the one of the button and the key. The first electronic apparatus 100*a* may transmit the altered apparatus ID in operation 212.

Meanwhile, the second electronic apparatus 100*b* may search for other electronic apparatuses that are connectable in operation 208 after entry into the pairing mode. With the search for the electronic apparatuses that can be connected (paired), the second electronic apparatus 100*b* may receive the apparatus IDs or the altered apparatus IDs from other electronic apparatuses. According to an embodiment of the present disclosure, the second electronic apparatus 100*b* may receive the altered apparatus ID from the first electronic apparatus 100*a*.

When the altered apparatus ID is received from the first electronic apparatus 100*a*, the second electronic apparatus 100*b* may determine additional information included in the altered apparatus ID in operation 214. According to an embodiment of the present disclosure, the second electronic apparatus 100*b* may determine how strong the first electronic apparatus 100*a* has been shaken or how many times the first electronic apparatus 100*a* has been shaken, based on the additional information included in the altered apparatus ID. According to an embodiment of the present disclosure, the second electronic apparatus 100*b* may determine how strongly the user has tapped the microphone of the first electronic apparatus 100*a* and/or how many times the user has tapped the microphone of the first electronic apparatus 100*a*, based on the additional information included in the altered apparatus ID. According to an embodiment of the present disclosure, the second electronic apparatus 100*b* may determine how long the user has pressed the button and/or the key of the first electronic apparatus 100*a* or how many times the user has pressed the button and/or the key of the first electronic apparatus 100*a*, based on the additional information included in the altered apparatus ID.

The second electronic apparatus 100*b* may display the apparatus ID according to the display method corresponding to the additional information included in the altered apparatus ID in operation 216. According to an embodiment of the present disclosure, the apparatus ID may be displayed to be highlighted darker, may be displayed to be shaken more, and/or may be displayed such that a text size of the apparatus ID increases in proportion to an intensity and/or a number of times of shaking the first electronic apparatus 100*a*, an intensity and/or a number of times of tapping on the microphone of the first electronic apparatus 100*a*, and/or a duration or a number of times of pressing of the button and/or the key of the first electronic apparatus 100*a*.

Figure 3:
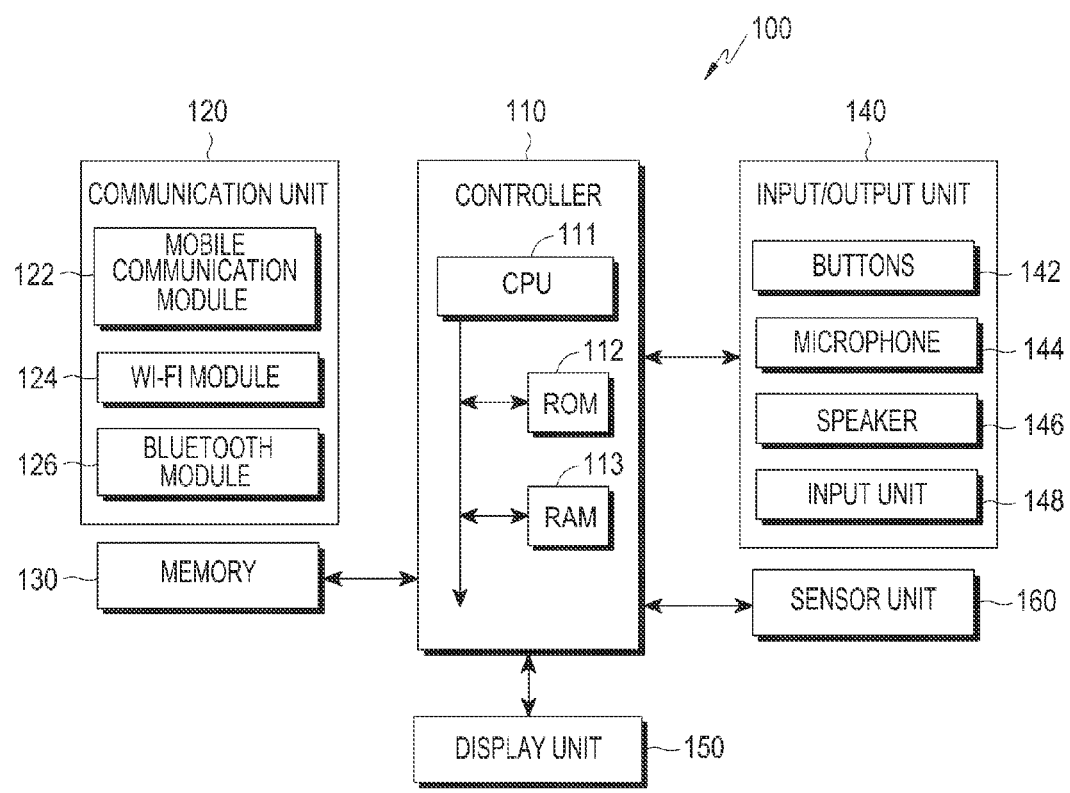
FIG. 3 is a block diagram of an electronic apparatus according to an embodiment of the present disclosure.

FIG. 3 is a block diagram of an electronic apparatus according to an embodiment of the present disclosure.

Referring to FIG. 3, an electronic apparatus 100 is illustrated, where the electronic apparatus 100 may include a controller 110, a communication unit 120, a memory 130, an input/output unit 140, a display unit 150 and a sensor unit 160.

The controller 110 may include a Central Processing Unit (CPU) 111, a Read-Only Memory (ROM) 112 that stores control programs for controlling the electronic apparatus 100 and a Random Access Memory (RAM) 113 that stores signals or data input from outside of the electronic device 100 or that is used as a storage area for operations of the electronic apparatus 100. The CPU 111 may include a single core, a dual core, a triple core or a quadruple core. The CPU 111, the ROM 112 and the RAM 113 may be connected with each other through an internal bus. The controller 110 may control the communication unit 120, the memory 130, the input/output unit 140, the display unit 150 and the sensor unit 160. According to an embodiment of the present disclosure, the controller 110 may detect the user's action in the pairing mode to thereby determine the additional information according to the user's action, and may control to transmit the altered apparatus ID including the apparatus ID of the electronic apparatus and the additional information to other electronic apparatuses that can be paired with the electronic apparatus. According to an embodiment of the present disclosure, the controller 110 may determine the display method corresponding to the received additional information included in the altered apparatus ID in the pairing mode, and may control to make the additional information included in the altered apparatus ID hidden and display the apparatus ID by the determined display method.

The communication unit 120 may allow the electronic apparatus 100 to communicate with external apparatuses by using at least one or more antennas (not shown) through at least one or more communication modules under the control of the controller 110. The communication module 120 may include a mobile communication module 122, a Wi-Fi module 124, a Bluetooth module 126, and the like. The mobile communication module 122 may transmit and/or receive wireless signals for voice calls, video calls, short message services and/or multimedia message services to and/or from mobile phones (not shown), smart phones (not shown), tablet PCs and/or other devices (not shown), which have telephone numbers entered in the electronic apparatus 100. The Wi-Fi module 124 may be connected to the Internet in an area where an access point (AP) (not shown) is provided under the control of the controller 110. In addition, the Wi-Fi module 124 may be connected (paired) with the other electronic apparatus' by a Wi-Fi direct communication method, by a hot-spot communication method and/or a tethering communication method under the control of the controller 110. The Wi-Fi module 124 may support a wireless Local Area Network (LAN) standard "IEEE802.11x" of the Institute of Electrical and Electronics Engineers (IEEE). The Bluetooth module 126 may make Bluetooth communication between the electronic apparatus 100 and an image formation apparatus (not shown) in wireless communication according to the control of the controller 110. The Bluetooth module 126 may be connected (paired) with the other electronic apparatus by a Bluetooth communication method according to the control of the controller 110. The communication unit 120 may include an Infrared Data Association (IrDA) module and a Near Field Communication (NFC) module as well as the above communication modules.

The memory 130 may store signals and input/output data corresponding to the operations of the communication unit 120, the input/output unit 140, the display unit 150 and the sensor unit 160 under the control of the controller 110. The memory 130 may store a plurality of programs for the control of the electronic apparatus 100 or the controller 110 and a plurality of applications.

The "memory" may be construed to encompass the memory 130, the ROM 112 and RAM 113 in the controller 110, and/or memory cards (e.g., Secure Digital (SD) cards or memory sticks)(not shown) installed in the electronic apparatus 100. The memory may include non-volatile memories, volatile memories, hard disk drives (HDDs) or solid-state drives (SSDs).

In addition, the memory 130 may store applications for various functions, such as navigation, video calls, games and time based alarm applications, images for providing graphic user interfaces (GUIs) related thereto, user information, documents, a database or data related to processing touch inputs, background images (e.g., a menu image, a stand-by image, and the like) required to operate the electronic apparatus 100, and/or operating programs. The memory 130 may be a machine-readable (e.g., non-transitory computer-readable) medium which refers to a medium that provides data to the machine for executing a specific function. The machine-readable medium may be storage medium. The memory 130 may include a non-volatile medium and a volatile medium. The medium shall be tangible so that instructions transferred by the medium may be detected by a physical mechanism that reads the instructions by the machine.

The machine-readable medium may include floppy disks, flexible disks, hard disks, magnetic tapes, compact disc read-only memories (CD-ROMs), optical discs, punch cards, paper tapes, RAMs, Programmable Read-Only Memories (PROMs), Erasable PROMs (EPROMs) and Flash-EPROMs, but may not be limited thereto.

The input/output unit 140 may include at least one of buttons 142, a microphone 144, a speaker 146 and an input unit 148. The input/output unit 140 is not limited to the above elements, and it may provide a cursor control, such as a mouse, a track ball, a joy stick and/or cursor direction keys, for controlling movement of a cursor on the display unit 150.

The buttons 142 may be formed on a front, a side and/or a back surface of a housing of the electronic apparatus 100, and may include at least one of a power/lock button, a volume button, a menu button, a home button, a back button, and a search button. According to an embodiment of the present disclosure, the buttons 142 may include a pairing request button, and an input signal may be provided to the controller 110 upon the press of the pairing request button by the user. According to an embodiment of the present disclosure, the buttons 142 may be implemented in the form of soft keys through a display means, such as a touch screen.

The microphone 144 may receive an input of a voice or sound and create electrical signals under the control of the controller 110.

The speaker 146 may output sound corresponding to various sound signals (e.g., wireless signals, digital audio files, digital movie files, and the like) from various components, such as the communication unit 120 and the sensor unit 160, to the outside of the electronic apparatus 100 under the control of the controller 110. One or more speakers 146 may be provided on the appropriate positions of the housing of the electronic apparatus 100. According to an embodiment of the present disclosure, the input/output unit 140 may output a sound signal by the user's tapping on the microphone 144 to the controller 110.

The input unit 148 may be kept inside the electronic apparatus 100, and may be drawn or detached from the electronic apparatus 100 for use. An attachment/detachment sensing switch that operates in response to attachment and detachment of the input unit 148 may be provided on a specific area inside the terminal 100 where the input unit 148 is inserted, and may provide signals corresponding to the attachment and detachment of the input unit 148 to the controller 110. The attachment/detachment sensing switch may be provided on a specific area where the input unit 148 is inserted to contact with the input unit 148 directly or indirectly when the input unit 148 is attached. Accordingly, the attachment/detachment sensing switch may create signals corresponding to the attachment or detachment of the input unit 148 based on the direct or indirect contact with the input unit 148 and provide the same to the controller 110.

The display unit 150 may be a touch screen. The touch screen 150 may receive at least one input of a user's gestures through a user's body (e.g., fingers including an index finger) and/or a touchable input means (e.g., a stylus, a pen, and/or an electronic pen). Further, the touch screen 150 may include a pen recognition panel that recognizes inputs of pens, such as the stylus pen or the electronic pen, and the pen recognition panel may detect a distance between the pen and the touch screen 150 by a magnetic field. Furthermore, the touch screen 150 may receive an input of continuous movement of at least one touch as the user's gesture. The touch screen 150 may transmit analog signals corresponding to the input user's gestures. This touch screen 150 may be implemented by, for example, a resistive type touch screen, a capacitive type touch screen, an infrared type touch screen, and/or an acoustic wave type touch screen.

More specifically, the touch screen 150 may be formed in a layered structure of a panel that detects the input by the fingers or the input unit 148 through the change in the induced electromotive force and a panel that detects contacts with the touch screen 150 by the fingers or the input unit 148, which are spaced a predetermined distance from each other or contact with each other. The touch screen 150 has a plurality of pixels and displays images through the pixels. The touch screen 150 may adopt Liquid Crystal Displays (LCDs), Organic Light Emitting Diodes (OLEDs), LEDs, and the like.

The sensor unit 160 may include at least one sensor that detects the status of the electronic apparatus 100. For example, the sensor unit 160 may include an acceleration sensor that detects the action (e.g., a rotation of the electronic apparatus 100, an acceleration acting on the electronic apparatus 100 and/or a vibration) of the electronic apparatus 100, a geo-magnetic sensor that detects the point of the compass by using an Earth magnetic field, and/or a gyro-sensor that detects angular velocity of the electronic apparatus 100. At least one sensor may detect the status of the electronic apparatus and create a signal corresponding to the detection to be thereby transmitted to the controller 110. According to an embodiment of the present disclosure, the acceleration sensor of the sensor unit 160 may provide a signal corresponding to the shaking of the electronic apparatus 100 by the user to the controller 110.

According to various embodiments of the present disclosure, the electronic apparatus 100 may transmit the apparatus ID for the pairing and receive the same to be displayed for the pairing.

Figure 4:
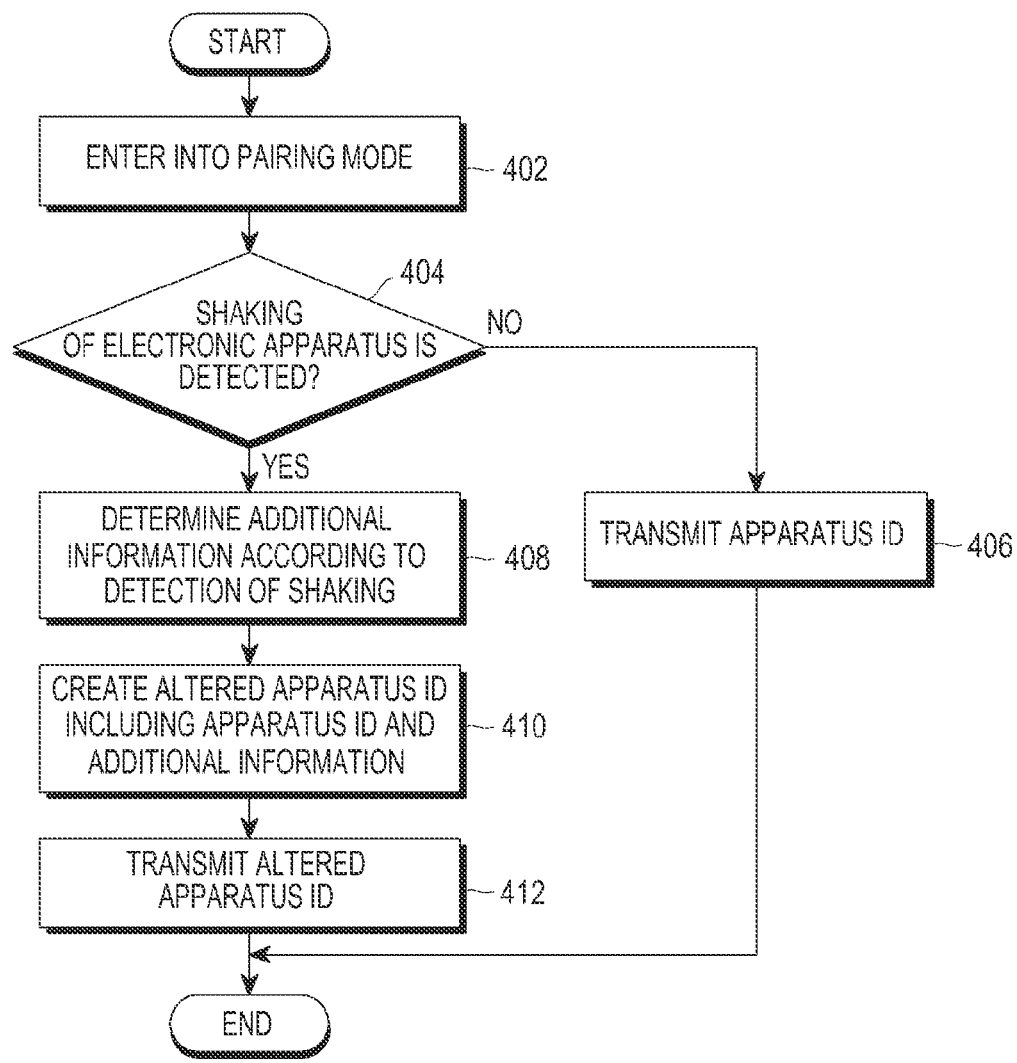
FIG. 4 is a flowchart illustrating an operation of transmitting an apparatus Identification (ID) for pairing by an electronic apparatus according to an embodiment of the present disclosure.

FIG. 4 is a flowchart illustrating an operation of transmitting an apparatus ID for pairing by an electronic apparatus according to an embodiment of the present disclosure.

Referring to FIG. 4, a flowchart is illustrated, where the electronic apparatus 100, as illustrated in FIG. 3, may enter into a pairing mode in operation 402. According to an embodiment of the present disclosure, the electronic apparatus 100 may perform the pairing by a wireless communication method according to the user's request for the pairing. According to various embodiments of the present disclosure, the wireless communication method may include a Bluetooth communication method, a Wi-Fi direct communication method, a hot-spot communication method, a tethering communication method, and the like.

After the entry into the pairing mode, the electronic apparatus 100 may determine whether a shaking of the electronic apparatus is detected in operation 404. According to an embodiment of the present disclosure, the electronic apparatus 100 may detect the shaking of the electronic apparatus due to the user's action of shaking the electronic apparatus 100 by using an acceleration sensor of the sensor unit 160 as illustrated in FIG. 3. According to an embodiment of the present disclosure, the electronic apparatus 100 may detect the duration, the number of times and/or the intensity of the shaking of the electronic apparatus.

If the shaking of the electronic apparatus is not detected, the electronic apparatus 100 may transmit the apparatus ID of the electronic apparatus 100 in operation 406. The apparatus ID may be received by the other electronic apparatus that is to be paired. The apparatus ID may be information for identifying the electronic apparatus 100. According to an embodiment of the present disclosure, the apparatus ID may be an apparatus name, an apparatus type, and/or an apparatus model name corresponding to the electronic apparatus 100.

If the shaking of the electronic apparatus is detected, the electronic apparatus 100 may determine the additional information according to the detection of the shaking in operation 408. According to an embodiment of the present disclosure, the electronic apparatus 100 may determine the additional information based on a duration, a number of times and/or an intensity of the shaking of the electronic apparatus 100.

For example, if the shaking of the electronic apparatus lasts for one second, the electronic apparatus 100 may determine the additional information corresponding to one second, and if the shaking of the electronic apparatus lasts for two seconds, the electronic apparatus 100 may determine the additional information corresponding to two seconds. Further, if the electronic apparatus has been shaken once, the electronic apparatus 100 may determine the additional information corresponding to one shake, and if the electronic apparatus has been shaken twice, the electronic apparatus 100 may determine the additional information corresponding to two shakes. Furthermore, if the intensity of the shaking of the electronic apparatus is at a first level, the electronic apparatus 100 may determine the additional information corresponding to the first level, and if the intensity of the shaking of the electronic apparatus is at a second level, the electronic apparatus 100 may determine the additional information corresponding to the second level. At this time, a maximum number of times of the shaking to be counted and the levels of the intensity of the shaking to be determined may be pre-defined.

The electronic apparatus 100 may create an altered apparatus ID that includes the apparatus ID and the additional information in operation 410. According to an embodiment of the present disclosure, if the apparatus ID of the electronic apparatus 100 is "S285" and the shaking of the electronic apparatus lasts for one second, then the electronic apparatus 100 may create the altered apparatus ID "S285*1" which includes the additional information of "*1". Further, if the shaking of the electronic apparatus lasts for two seconds, then the electronic apparatus 100 may create the altered apparatus ID "S285*2" which includes the additional information of "*2". Furthermore, if the shaking of the electronic apparatus lasts for three seconds, then the electronic apparatus 100 may create the altered apparatus ID "S285*3" which includes the additional information of "*3". Meanwhile, the electronic apparatus 100 may create the altered apparatus ID that includes the additional information regarding the number of times of the shaking and the intensity of the shaking.

The electronic apparatus 100 may transmit the altered apparatus ID to the other electronic apparatus that can be paired in operation 412.

Figure 5:
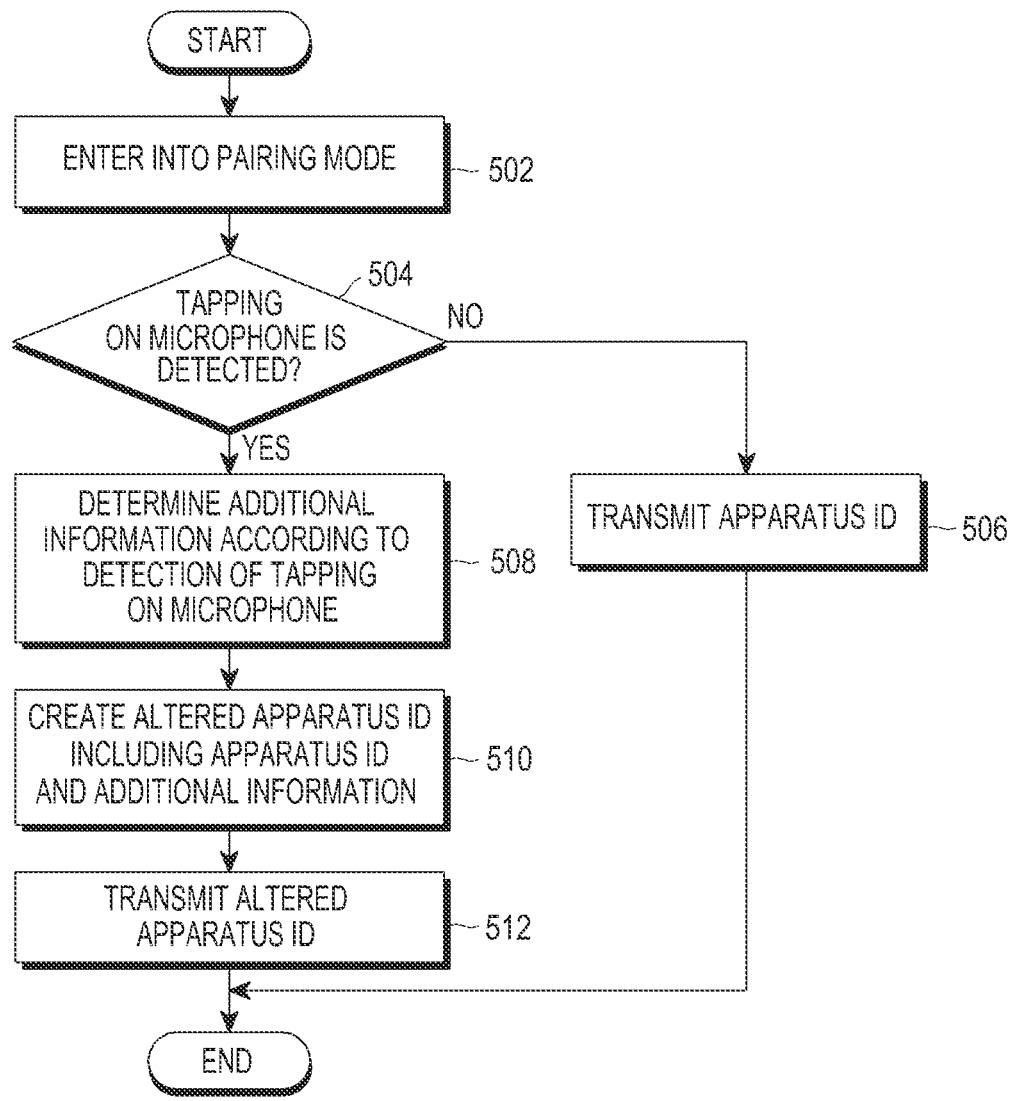
FIG. 5 is a flowchart illustrating an operation of transmitting an apparatus ID for pairing by an electronic apparatus according to an embodiment of the present disclosure.

FIG. 5 is a flowchart illustrating an operation of transmitting an apparatus ID for pairing by an electronic apparatus according to an embodiment of the present disclosure.

Referring to FIG. 5, a flowchart is illustrated, where the electronic apparatus 100, as illustrated in FIG. 3, may enter into a pairing mode in operation 502. According to an embodiment of the present disclosure, the electronic apparatus 100 may perform the pairing by using a wireless communication method according to the user's request for the pairing. According to various embodiments of the present disclosure, the wireless communication method may include a Bluetooth communication method, a Wi-Fi direct communication method, a hot-spot communication method, a tethering communication method, and the like.

After the entry into the pairing mode, the electronic apparatus 100 may determine whether tapping on the microphone is detected in operation 504. According to an embodiment of the present disclosure, the electronic apparatus 100 may analyze a sound signal input through the microphone 144, as illustrated in FIG. 3, to thereby detect the tapping on the microphone 144. For example, the electronic apparatus 100 may detect the tapping on the microphone 144, a number of times of the tapping on the microphone 144, and/or an intensity of the tapping on the microphone 144.

If the tapping on the microphone 144 is not detected, the electronic apparatus 100 may transmit the apparatus ID of the electronic apparatus 100 in operation 506. The apparatus ID may be received by the other electronic apparatus that is to be paired. The apparatus ID may be information for identifying the electronic apparatus 100. According to an embodiment of the present disclosure, the apparatus ID may be an apparatus name, an apparatus type, and/or an apparatus model name corresponding to the electronic apparatus 100.

If the tapping on the microphone 144 is detected, the electronic apparatus 100 may determine the additional information according to the detection of the tapping on the microphone 144 in operation 508. According to an embodiment of the present disclosure, the electronic apparatus 100 may determine the additional information for the tapping on the microphone 144, the number of times of the tapping on the microphone 144, and/or the intensity of the tapping on the microphone 144. For example, if the microphone 144 has been tapped once, the electronic apparatus 100 may determine the additional information corresponding to one tap, and if the microphone 144 has been tapped twice, the electronic apparatus 100 may determine the additional information corresponding to two taps. Further, if the intensity of the tapping on the microphone 144 is at a first level, the electronic apparatus 100 may determine the additional information corresponding to the first level, and if the intensity of the tapping on the microphone 144 is at a second level, the electronic apparatus 100 may determine the additional information corresponding to the second level. At this time, a maximum number of times of the tapping to be counted and the levels of the intensity of the tapping to be determined may be pre-defined.

The electronic apparatus 100 may create an altered apparatus ID that includes the apparatus ID and the additional information in operation 510. According to an embodiment of the present disclosure, if the apparatus ID of the electronic apparatus 100 is "S286" and the microphone 144 has been tapped once, then the electronic apparatus 100 may create the altered apparatus ID "S286*1" which includes the additional information of "*1". Further, if the microphone 144 has been tapped twice, the electronic apparatus 100 may create the altered apparatus ID "S286*2" which includes the additional information of "*2". Furthermore, if the microphone 144 has been tapped three times, the electronic apparatus 100 may create the altered apparatus ID "S286*3"

which includes the additional information of "*3". Meanwhile, the electronic apparatus may create the altered apparatus ID that includes the additional information on the intensity of the tapping on the microphone 144.

The electronic apparatus 100 may transmit the altered apparatus ID to the other electronic apparatus that can be paired in operation 512.

Figure 6:
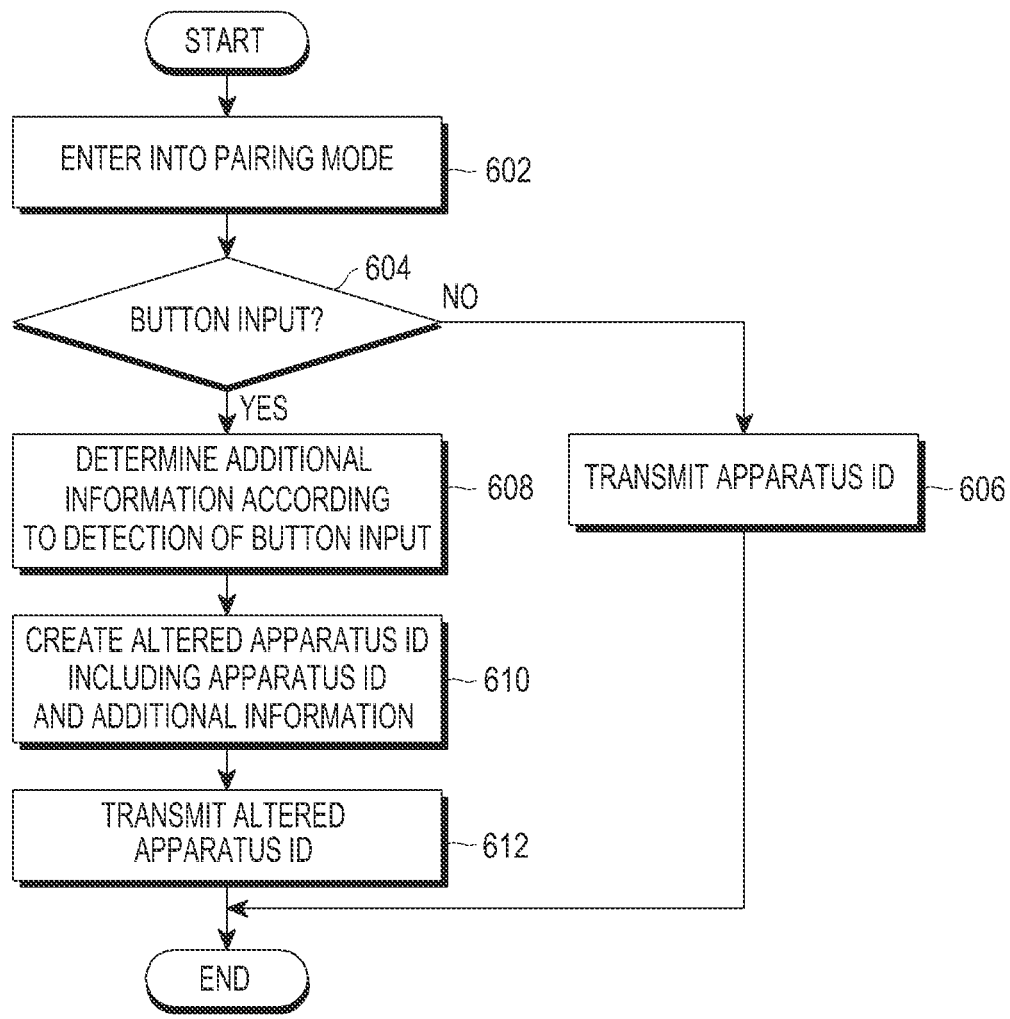
FIG. 6 is a flowchart illustrating an operation of transmitting an apparatus ID for pairing by an electronic apparatus according to an embodiment of the present disclosure.

FIG. 6 is a flowchart illustrating an operation of transmitting an apparatus ID for pairing by an electronic apparatus according to an embodiment of the present disclosure.

Referring to FIG. 6, a flowchart is illustrated, where the electronic apparatus 100, as illustrated in FIG. 3, may enter into a pairing mode in operation 602. According to an embodiment of the present disclosure, the electronic apparatus 100 may perform the pairing by a wireless communication method according to the user's request for the pairing. According to various embodiments of the present disclosure, the wireless communication method may include a Bluetooth communication method, a Wi-Fi direct communication method, a hot-spot communication method, a tethering communication method, and the like.

After the entry into the pairing mode, the electronic apparatus 100 may determine whether a button (or key) input is detected in operation 604. According to an embodiment of the present disclosure, the electronic apparatus 100 may detect the input according to a duration of the pressing of one of the buttons 142, as illustrated in FIG. 3, and a number of times of pressing one of the buttons.

If the input of one of the buttons 142 is not detected, the electronic apparatus 100 may transmit the apparatus ID of the electronic apparatus 100 in operation 606. The apparatus ID may be received by the other electronic apparatus that is to be paired. The apparatus ID may be information for identifying the electronic apparatus 100. According to an embodiment of the present disclosure, the apparatus ID may be an apparatus name, an apparatus type, and/or an apparatus model name corresponding to the electronic apparatus 100.

If the button input is detected, the electronic apparatus 100 may determine the additional information according to the detection of the button input in operation 608. According to an embodiment of the present disclosure, the electronic apparatus 100 may determine the additional information on each of a duration of pressing one of the buttons 142 and a number of times of pressing one of the buttons 142. For example, if the pressing of the button lasts for one second, the electronic apparatus 100 may determine the additional information corresponding to one second, and if the pressing of the button lasts for two seconds, the electronic apparatus 100 may determine the additional information corresponding to two seconds. Further, if the button has been pressed once, the electronic apparatus 100 may determine the additional information corresponding to one press, and if the button has been pressed twice, the electronic apparatus 100 may determine the additional information corresponding to two presses.

The electronic apparatus 100 may create an altered apparatus ID that includes the apparatus ID and the additional information in operation 610. According to an embodiment of the present disclosure, if the apparatus ID of the electronic apparatus 100 is "S287" and the button press lasts for one second, then the electronic apparatus 100 may create the altered apparatus ID "S287*1" which includes the additional information of "*1". Further, if the button press lasts for two seconds, the electronic apparatus 100 may create the altered apparatus ID "S287*2" which includes the additional information of "*2".

The electronic apparatus 100 may transmit the altered apparatus ID to the other electronic apparatus that can be paired in operation 612.

According to various embodiments of the present disclosure, the electronic apparatus 100 may receive and display the apparatus ID or the altered apparatus ID in pairing.

Figure 7:
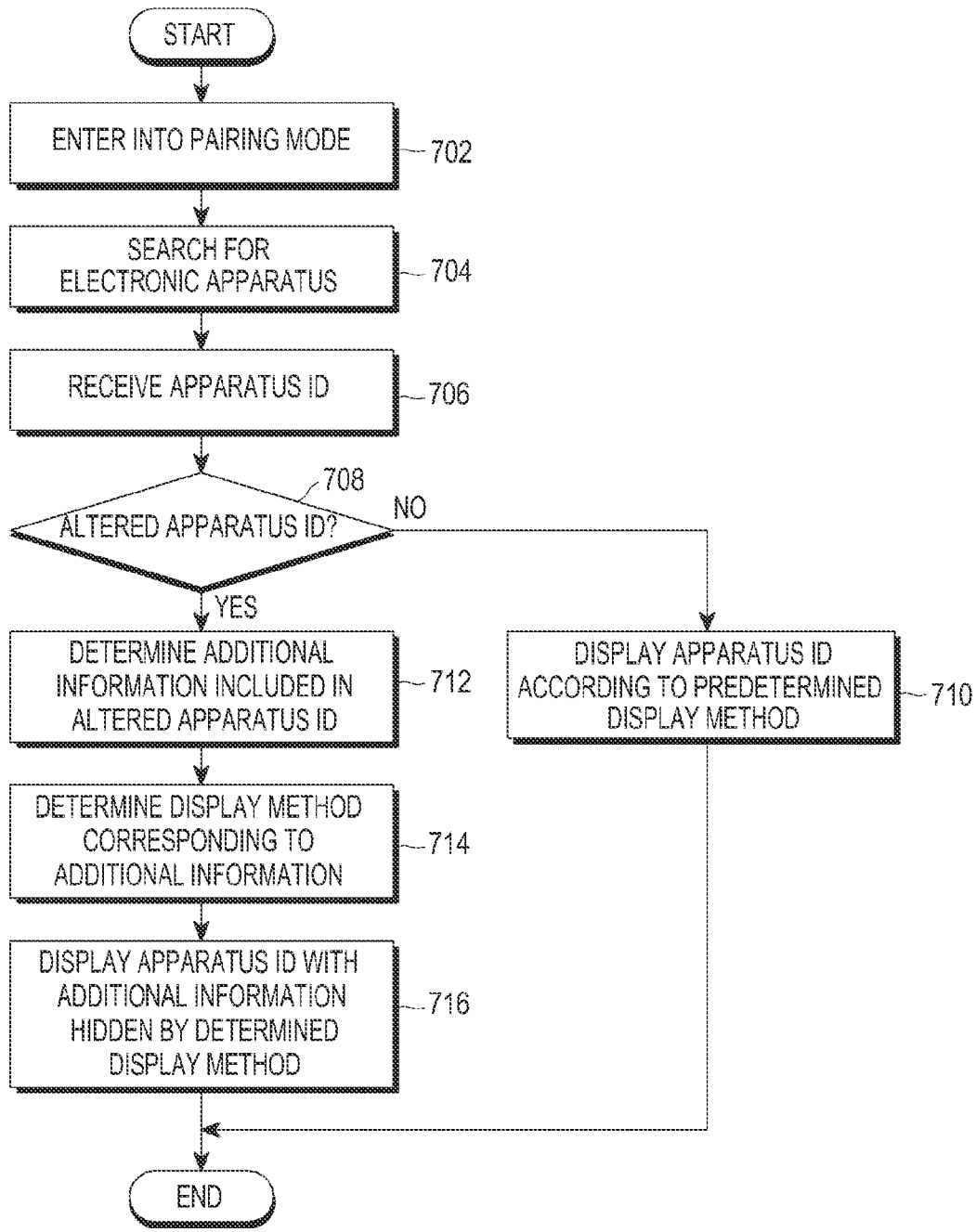
FIG. 7 is a flowchart illustrating an operation of displaying an apparatus ID for pairing by an electronic apparatus according to an embodiment of the present disclosure.

FIG. 7 is a flowchart illustrating an operation of displaying an apparatus ID for pairing by an electronic apparatus according to an embodiment of the present disclosure.

Referring to FIG. 7, a flowchart is illustrated, where the electronic apparatus 100, as illustrated in FIG. 3, may enter into a pairing mode in operation 702. According to an embodiment of the present disclosure, the electronic apparatus 100 may perform the pairing by a wireless communication method according to the user's request for the pairing. According to various embodiments of the present disclosure, the wireless communication method may include a Bluetooth communication method, a Wi-Fi direct communication method, a hot-spot communication method, a tethering communication method, and the like.

The electronic apparatus 100 may search for other apparatuses in operation 704. According to an embodiment of the present disclosure, the electronic apparatus 100 may search for pairing requesting electronic apparatuses that request the connection (pairing).

As the result of the search, the electronic apparatus 100 may receive apparatus ID from the pairing requesting electronic apparatus in operation 706.

The electronic apparatus 100 may determine whether the received apparatus ID is the altered apparatus ID in operation 708. If the received apparatus ID is not the altered apparatus ID, the electronic apparatus 100 may display the apparatus ID by a predetermined method, i.e., the normal display method in operation 710.

If the received apparatus ID is the altered apparatus ID, the electronic apparatus 100 may determine the additional information included in the altered apparatus ID in operation 712. According to an embodiment of the present disclosure, when the altered apparatus ID of "SVH-E250S(8888)*1" is received, the electronic apparatus may determine that "SVH-E250S(8888)" is the apparatus ID and "*1" is the additional information.

The electronic apparatus 100 may determine the display method corresponding to the additional information in operation 714. According to an embodiment of the present disclosure, based on the additional information, the electronic apparatus 100 may determine how strong and how many times the pairing requesting electronic apparatus corresponding to the apparatus ID has been shaken, and may determine the display method corresponding thereto. According to an embodiment of the present disclosure, based on the additional information, the electronic apparatus 100 may determine how strong and how many times the microphone of the pairing requesting electronic apparatus corresponding to the apparatus ID has been tapped, and may determine the display method corresponding thereto. According to an embodiment of the present disclosure, based on the additional information, the electronic apparatus 100 may determine how long and how many times the button and/or key of the pairing requesting electronic apparatus corresponding to the apparatus ID has been pressed, and may determine the display method corresponding thereto.

The electronic apparatus 100 may make the additional information hidden and display the apparatus ID by the determined method in operation 416. According to an embodiment of the present disclosure, the apparatus ID may be displayed to be highlighted darker, or may be displayed to shake more, or may be displayed such that the text size of the apparatus ID increases, proportional to the intensity or the number of times of the shaking of the pairing requesting electronic apparatus corresponding to the apparatus ID, the intensity or the number of times of the tapping on the microphone of the electronic apparatus requesting the pairing and corresponding to the apparatus ID, and/or the duration or the number of times of the pressing of the button and/or key of the electronic apparatus requesting the pairing and corresponding to the apparatus ID.

Figure 8:
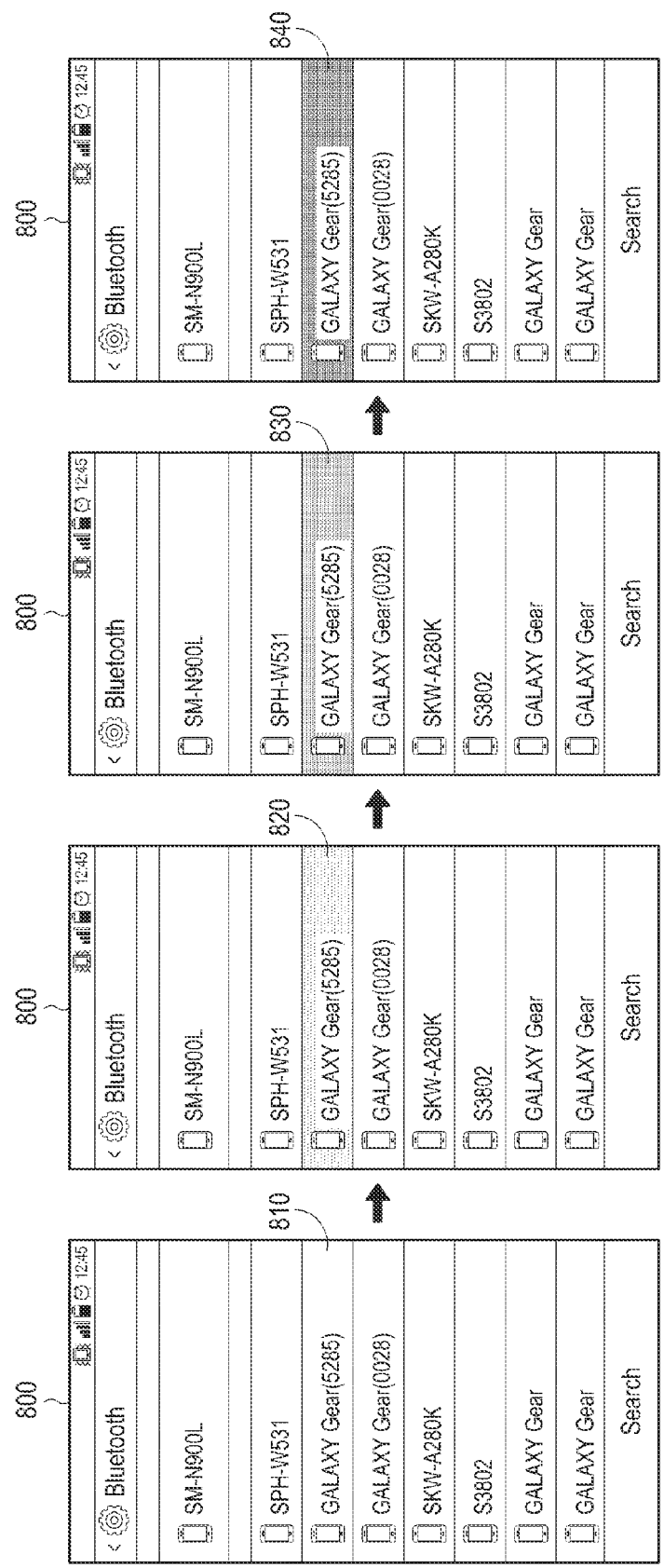
FIG. 8 is a view illustrating an image of displaying an apparatus ID for pairing by an electronic apparatus according to an embodiment of the present disclosure.

FIG. 8 is a view illustrating an image of displaying an apparatus ID for pairing by an electronic apparatus according to the first embodiment of the present disclosure.

Referring to FIG. 8, an apparatus ID list image 800 displayed by the display unit 150 of the electronic apparatus 100, as illustrated in FIG. 3, is illustrated, where the apparatus ID list image 800 includes apparatus IDs of searched electronic apparatuses that can be paired.

According to an embodiment of the present disclosure, the electronic apparatus 100 may receive an apparatus ID of "GALAXY Gear(5285)" that does not include additional information from the electronic apparatus having the apparatus ID corresponding to "GALAXY Gear(5285)", and then may receive an altered apparatus ID of "GALAXY Gear (5285)*1" after one second, an altered apparatus ID of "GALAXY Gear(5285)*2" after two seconds, and an altered apparatus ID of "GALAXY Gear(5285)*3" after three seconds, respectively, depending on the duration of a shaking of the electronic apparatus having the apparatus ID corresponding to "GALAXY Gear(5285)".

When the apparatus ID of "GALAXY Gear(5285)" that does not include the additional information is received, the electronic apparatus 100 may display "GALAXY Gear (5285)" 810 on the apparatus ID list image 800. When the altered apparatus ID of "GALAXY Gear(5285)*1" is received, the electronic apparatus 100 may make "*1" hidden and display the apparatus ID of "GALAXY Gear (5285)" 820 that is highlighted at a first level on the apparatus ID list image 800. When the altered apparatus ID of "GALAXY Gear(5285)*2" is received, the electronic apparatus 100 may make "*2" hidden and display the apparatus ID of "GALAXY Gear(5285)" 830 that is highlighted at a second level. When the altered apparatus ID of "GALAXY Gear(5285)*3" is received, the electronic apparatus 100 may make "*3" hidden and display the apparatus ID of "GALAXY Gear(5285)" 840 that is highlighted at a third level.

Figure 9:
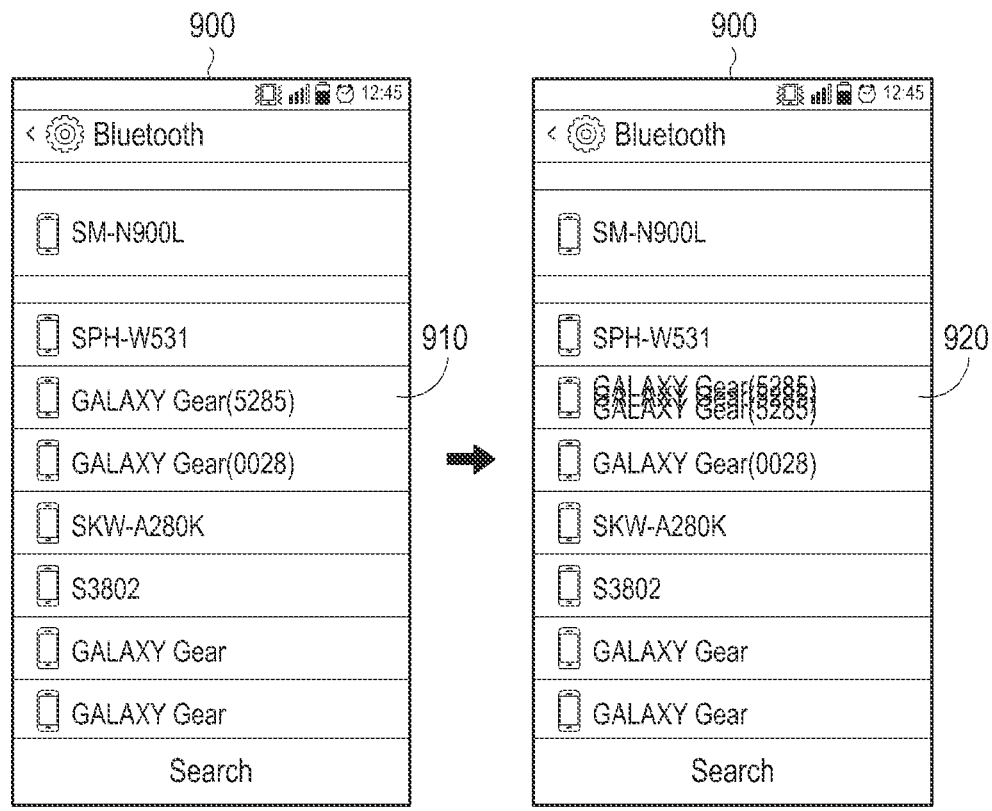
FIG. 9 is a view illustrating an image of displaying an apparatus ID for pairing by an electronic apparatus according to an embodiment of the present disclosure.

FIG. 9 is a view illustrating an image of displaying an apparatus ID for pairing by an electronic apparatus according to an embodiment of the present disclosure.

Referring to FIG. 9, an apparatus ID list image 900 displayed by the display unit 150 of the electronic apparatus 100, as illustrated in FIG. 3, is illustrated, where the apparatus ID list image 900 includes apparatus IDs of searched electronic apparatuses that can be paired.

According to an embodiment of the present disclosure, the electronic apparatus 100 may receive an apparatus ID of "GALAXY Gear(5285)" that does not include additional information from the electronic apparatus having the apparatus ID corresponding to "GALAXY Gear(5285)", and then may receive an altered apparatus ID of "GALAXY Gear (5285)*1", "GALAXY Gear(5285)*2", or "GALAXY Gear (5285)*3" depending on an intensity of shaking the electronic apparatus having the apparatus ID corresponding to "GALAXY Gear(5285)".

When the apparatus ID of "GALAXY Gear (5285)" that does not include the additional information is received, the electronic apparatus 100 may display "GALAXY Gear (5285)" 910 on the apparatus ID list image 900. When the altered apparatus ID of "GALAXY Gear (5285)*1", "GALAXY Gear(5285)*2" or "GALAXY Gear(5285)*3" is received, the electronic apparatus 100 may make "*1", "*2" or "*3" hidden and display the apparatus ID of "GALAXY Gear(5285)" 920 that has been processed to shake at a first level, a second level or a third level.

Figure 10:
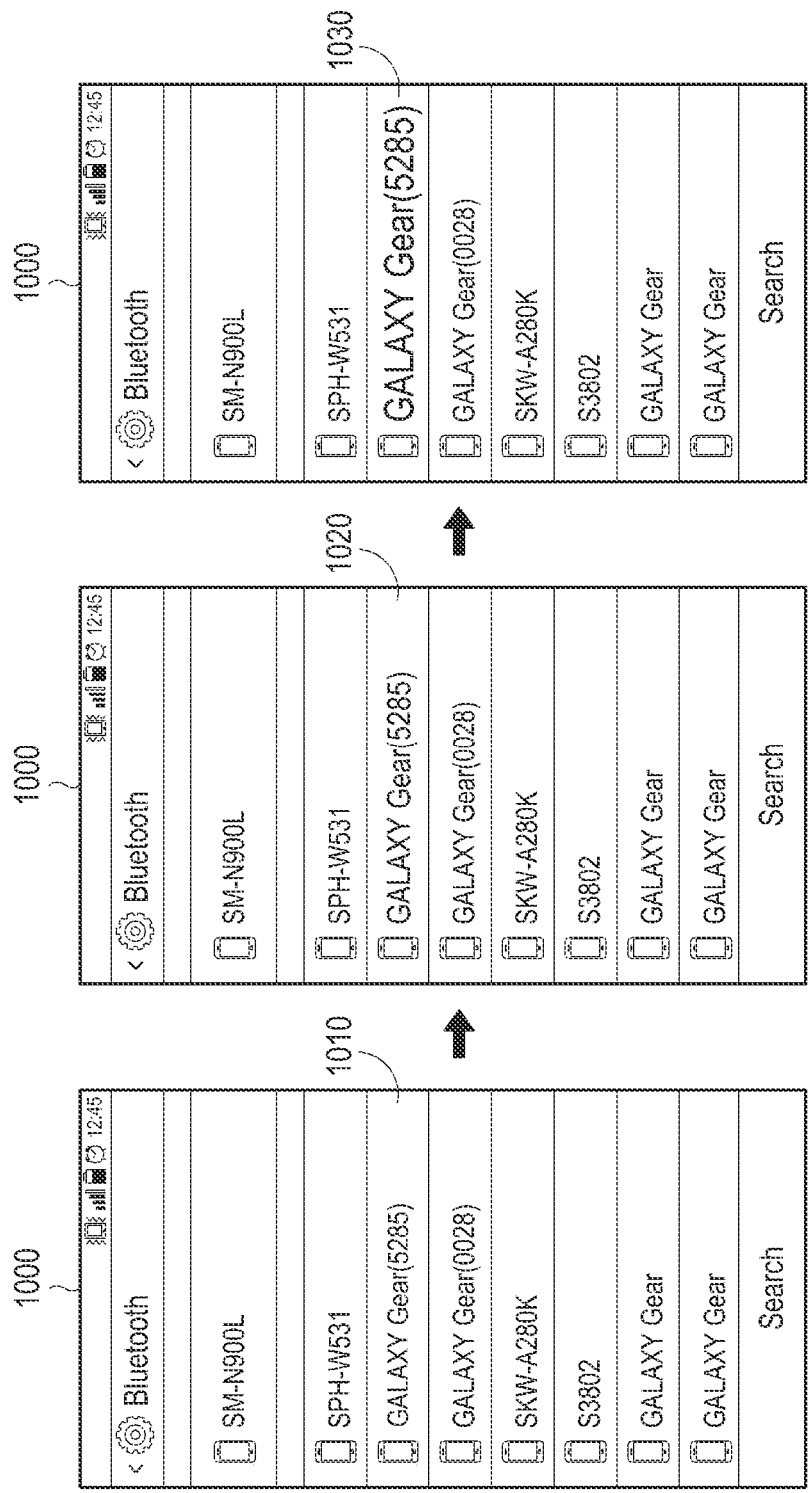
FIG. 10 is a view illustrating an image of displaying an apparatus ID for pairing by an electronic apparatus according to an embodiment of the present disclosure.

FIG. 10 is a view illustrating an image of displaying an apparatus ID for pairing by an electronic apparatus according to an embodiment of the present disclosure.

Referring to FIG. 10, an apparatus ID list image 1000 displayed by the display unit 150 of the electronic apparatus 100, as illustrated in FIG. 3, is illustrated, where the apparatus ID list image 1000 includes apparatus IDs of searched electronic apparatuses that can be paired.

According to an embodiment of the present disclosure, the electronic apparatus 100 may receive an apparatus ID of "GALAXY Gear(5285)" that does not include additional information from the electronic apparatus having the apparatus ID corresponding to "GALAXY Gear(5285)", and then may receive an altered apparatus ID of "GALAXY Gear (5285)*1", "GALAXY Gear(5285)*2", or "GALAXY Gear (5285)*3", depending on an intensity of shaking the electronic apparatus having the apparatus ID corresponding to "GALAXY Gear(5285)".

When the apparatus ID of "GALAXY Gear(5285)" that does not include the additional information is received, the electronic apparatus 100 may display "GALAXY Gear (5285)" 1010 on the apparatus ID list image 1000. When the altered apparatus ID of "GALAXY Gear(5285)*1" or "GALAXY Gear(5285)*2" is received, the electronic apparatus 100 may make "*1" or "*2" hidden and display the apparatus ID of "GALAXY Gear(5285)" 1020 that has been enlarged to a first size level or the apparatus ID of "GALAXY Gear(5285)" 1030 that has been enlarged to a second size level on the apparatus ID list image 1000.

The described component elements of an electronic device according to various embodiments of the present disclosure may be formed of one or more components, and a name of a corresponding component element may be changed based on a type of electronic device. An electronic device according to various embodiments of the present disclosure may be formed to include at least one of the described component elements, and a few component elements may be omitted or additional component elements may be further included. Furthermore, some of the elements of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least part of a device (for example, modules or functions thereof) or a method (for example, operations) according to the various embodiments of the present disclosure may be embodied by, for example, an instruction stored in a non-transitory computer-readable storage medium provided in a form of a programming module. When the instruction is performed by at least one processor (for example, the CPU 110 as illustrated in FIG. 3), the at least one processor may perform a function corresponding to the instruction. The non-transitory computer-readable storage medium may be, for example, the memory 130 as illustrated in FIG. 3. At least some of the programming modules may be implemented (for example, executed) by, for example, the CPU 110. At least a part of the programming module may include, for example, a module, a program, a routine, a set of instructions and/or a process for performing one or more functions.

The non-transitory computer-readable storage medium may include magnetic media such as a hard disk, a floppy disk, and a magnetic tape, optical media such as a CD-ROM and a DVD, magneto-optical media such as a floptical disk, and hardware devices specially configured to store and perform a program instruction (for example, programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
  a communication unit configured to transmit an altered apparatus Identification (ID); and
  a controller configured to:
    detect a user's action in a pairing mode of the electronic apparatus,
      determine additional information according to the user's action, and
      transmit the altered apparatus ID including an apparatus ID of the electronic apparatus and the additional information to another electronic apparatus that can be paired with the electronic apparatus,
    wherein the additional information corresponds to a display method of the apparatus ID on the other device.

2. The electronic apparatus of claim 1, further comprising a sensor configured to detect a shaking of the electronic apparatus,
  wherein the controller is further configured to detect the user's action including at least one of a duration of the shaking of the electronic apparatus, a number of times of the shaking of the electronic apparatus, and an intensity of the shaking of the electronic apparatus.

3. The electronic apparatus of claim 1, further comprising a microphone configured to output a signal according to a tapping on the microphone,
  wherein the controller is further configured to detect at least one of a number of times of the tapping on the microphone and an intensity of the tapping on the microphone according to the user's action corresponding to the tapping on the microphone.

4. The electronic apparatus of claim 1, further comprising one of a button and a key,
  wherein the controller is further configured to detect one of (i) a duration of a pressing of the one of the button and the key and (ii) a number of times of the pressing of the one of the button and the key according to the user's action corresponding to the pressing of the one of the button and the key.

5. An electronic apparatus comprising:
  a communication unit configured to receive an altered apparatus Identification (ID) including an apparatus ID and additional information from another electronic apparatus that can be paired with the electronic apparatus;
  a controller configured to:
    determine a display method corresponding to the additional information included in the received altered apparatus ID in a pairing mode,
    make the additional information included in the altered apparatus ID hidden, and
    display the apparatus ID according to the determined display method; and
  a display unit configured to display the apparatus ID according to the determined display method.

6. The electronic apparatus of claim 5, wherein the additional information corresponds to at least one of a duration of a shaking of the other electronic apparatus, a number of times of the shaking of the other electronic apparatus, and an intensity of the shaking of the other electronic apparatus.

7. The electronic apparatus of claim 5, wherein the additional information corresponds to at least one of a number of times of tapping on a microphone of the other electronic apparatus and an intensity of the tapping on the microphone of the other electronic apparatus.

8. The electronic apparatus of claim 5, wherein the additional information corresponds to one of (i) a duration of a pressing of one of a button and a key of the other electronic apparatus and (ii) a number of times of the pressing of the one of the button and the key of the other electronic apparatus.

9. The electronic apparatus of claim 5, wherein the display method is one of a highlighting display method, a size enlarging display method, and a shaking display method.

10. A method of pairing an electronic apparatus and another electronic apparatus, the method comprising:
  detecting, by the electronic apparatus, a user's action in a pairing mode of the electronic apparatus;
  determining additional information according to the user's action;

creating an altered apparatus Identification (ID) that includes the additional information and an apparatus ID of the electronic apparatus; and transmitting the altered apparatus ID to the other electronic apparatus, wherein the additional information corresponds to a display method of the apparatus ID on the other device.

11. The method of claim 10, wherein the detecting of the user's action comprises detecting at least one of a duration of a shaking of the electronic apparatus, a number of times of the shaking of the electronic apparatus, and an intensity of the shaking of the electronic apparatus.

12. The method of claim 10, wherein the detecting of the user's action comprises detecting at least one of a number of times of a tapping on a microphone of the electronic apparatus and an intensity of the tapping on the microphone of the electronic apparatus.

13. The method of claim 10, wherein the detecting of the user's action comprises detecting at least one of (i) a duration of a pressing of one of a button and a key of the electronic apparatus and (ii) a number of times of the pressing of the one of the button and the key of the electronic apparatus.

14. A method of pairing an electronic apparatus and another electronic apparatus, the method comprising:

receiving an altered apparatus Identification (ID) that includes an apparatus ID and additional information from the other electronic apparatus;

determining a display method corresponding to the additional information included in the altered apparatus ID;

making the additional information included in the altered apparatus ID hidden; and displaying the apparatus ID according to the determined display method.

15. The method of claim 14, wherein the additional information corresponds to at least one of a duration of a shaking of the other electronic apparatus, a number of times of the shaking of the other electronic apparatus, and an intensity of the shaking of the other electronic apparatus.

16. The method of claim 15, wherein the display method is a highlighting display method, and wherein, while displaying the apparatus ID, an intensity of highlighting performed by the highlighting display method increases as one of the duration of the shaking increases, the number of times of the shaking increases, and the intensity of the shaking increases.

17. The method of claim 14, wherein the additional information corresponds to at least one of a number of times of a tapping on a microphone of the other electronic apparatus and an intensity of the tapping on the microphone of the other electronic apparatus.

18. The method of claim 17, wherein the display method is a size enlarging display method, and wherein, while displaying the apparatus ID, a size of the displayed apparatus ID increases according to the size enlarging display method as one of the duration of the shaking increases, the number of times of the shaking increases, and the intensity of the shaking increases.

19. The method of claim 14, wherein the additional information corresponds to one of (i) a duration of a pressing of one of a button and a key of the other electronic apparatus and (ii) a number of times of the pressing of the one of the button and the key of the other electronic apparatus.

20. The method of claim 14, wherein the display method is one of a highlighting display method, a size enlarging display method, and a shaking display method.

\* \* \* \* \*